March 21, 1961 J. H. HAINES ET AL 2,976,358

TELEVISION PICKUP SYSTEM

Filed April 19, 1957

INVENTORS
JESSE HILTON HAINES
FRANK TAMARO

BY Darby + Darby
ATTORNEYS

United States Patent Office 2,976,358

Patented Mar. 21, 1961

2,976,358

TELEVISION PICKUP SYSTEM

Jesse Hilton Haines, Clifton, and Frank Tamaro, Paterson, N.J., assignors, by mesne assignments, to Fairchild Camera and Instrument Corporation, Long Island City, N.Y., a corporation of Delaware Filed Apr. 19, 1957, Ser. No. 653,868

16 Claims. (Cl. 178—7.2)

This invention relates to a television pickup system, and more particularly to an improvement in a pickup system of the type that utilizes flying spot scanners.

The usual system for producing television type signals uses fixedly positioned lamps as a source of illumination, and a movable television camera of any well known type as the pickup means. Light reflects from the object to be televised, and impinges upon the camera which thereupon converts the light into electrical signals.

Another system of obtaining television type signals utilizes a somewhat different type of light source, the light therefrom reflecting from the object to phototubes, the output of which produces the electrical signals. The source of light for the second system is generally a cathode ray tube known as a "flying spot scanner," since a "flying" spot of light scans a pattern on a fluorescent faceplate. The output signal depends upon the instantaneous position of the light spot, the amount of reflection, the position of the pickup phototubes, and the spatial relation between these elements. The electrical signal developed by the pickup is converted into a television signal in a manner well known in the art. In this system the light source is movable, while the phototubes are fixedly positioned. The resultant image looks as though it were illuminated by lamps which are located in the position of the phototubes, and viewed from the position occupied by the light source. For the purpose of describing our invention, the foregoing background information will suffice, but additional information may be obtained from "An Experimental Simultaneous Color TV System" which appeared in the Proceedings of the Institute of Radio Engineers, vol. 35, September 1947, pp. 861 through 870; and "The Flying-Spot 'Live' Pickup" as described in the R.C.A. Review, vol. 5, 1947–8, pp. 224 through 228.

It is frequently desirable to be able to produce another view of the object, for instance, a close-up, a more distant shot, or a view from a different direction, and to achieve this result a previewing system is essential. If a second flying spot scanner, operating in the usual manner, were utilized for previewing, light from each light source would be simultaneously picked up by the phototubes, and the resultant signal would produce an image comprising two different views of the same object superposed upon each other.

This inability to preview limits the usefulness of the present day flying spot scanner technique, since it is impossible to frame, evaluate angles or lighting effects, or to ascertain in advance other conditions which may be objectionable.

It is therefore the principal object of our invention to provide an improved television pickup system.

It is another object of our invention to provide a flying spot scanner pickup system which permits preview.

Figure 1:
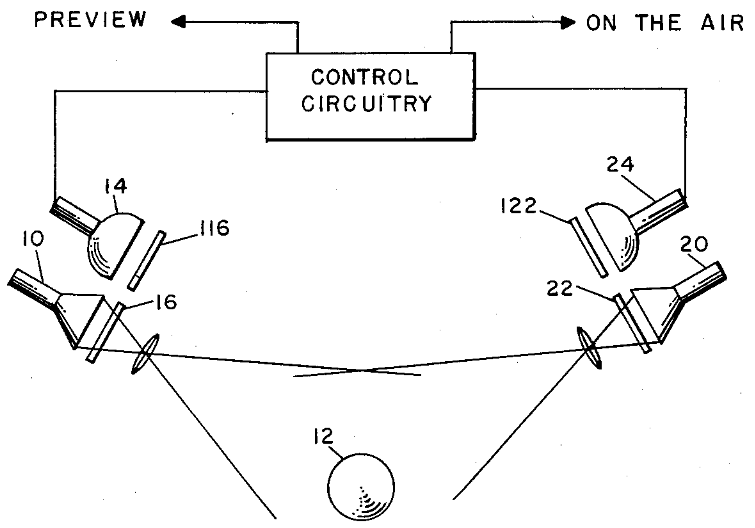
Figure 2:
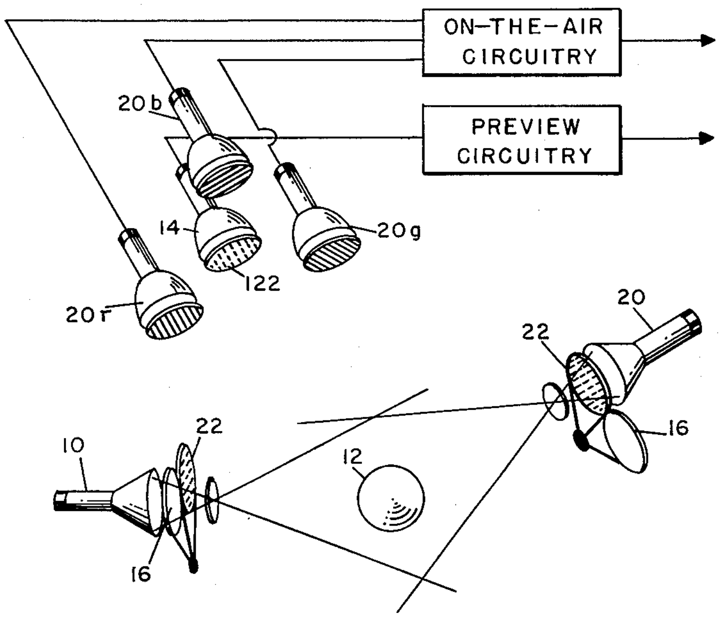

The attainment of these objects and others will be realized from the following specification, taken in conjunction with the drawings, in which, Fig. 1 is a diagrammatic illustration of the elements of our invention; and Fig. 2 illustrates another embodiment thereof.

The basic concept of our invention is that of color multiplexing. Basically, it provides for light to be divided into various spectrums; said spectrums permitting the attainment of the preview signal in one color, and the production of the "on-the-air" television signal in another color or colors. It will be understood that the word "light" as used above includes not only the visible spectrum but also the near visible such as radiations just outside the visible range, for example, infrared and ultraviolet, while "color" as used above refers not only to black and white pictures but also to monochromatic and polychromatic presentations.

Referring now to Fig. 1 there are shown elements which illustrate the basic concept of our invention. A first flying spot scanner 10 emits light which strikes an object 12, and is reflected to pickup means 14. A color filter 16 is positioned in front of light source 10, said filter permitting all light radiations except a predetermined narrow band to strike object 12. Pickup device 14 has placed in front of it another filter 116 having spectral characteristics which are similar to those of filter 16 described as being positioned in front of light source 10. It will thus be seen that, depending upon source 10, light of all wavelengths except the restricted bandwidth emanates from light source 10, strikes object 12, and is reflected from said object to pickup device 14. No light of the restricted bandwidth strikes object 12 or pickup device 14 from the first light source. Thus, as far as pickup device 14 is concerned, it sees a frontal view of the object in terms of the broad spectrum minus the restricted bandwidth, and its output signal is produced in terms of the position of the light spot of source 10, and the output signal of pickup 14.

Fig. 1 also illustrates a second light source 20 which has positioned in front of it a second filter 22 which passes only the narrow spectral band rejected by the first filter 16, filter 22 rejecting the band passed by the first filter 16. It will therefore be understood that the spectrums passed by filters 16 and 116 on one hand, and 22 on the other, are complementary and mutually exclusive. Another pickup device 24 has positioned in front of it a filter 122 having similar characteristics to filter 22 described as positioned in front of the second light source 20. Thus, the light from the second source 20 contains only the narrow spectral band. This light reflecting from object 12 is accessible only to pickup 24, which therefore sees a side view of object 12 in terms of only the narrow band produced by the second source 20.

The electrical signals produced by pickup devices 14 and 24 are treated separately, one of them (preferably 14 since it utilizes the wider spectrum and therefore permits more detail) being used for the production of the on-the-air television signals, while the other is used for previewing. It may thus be seen that each output signal is kept entirely separated from the other, and that there is no cross talk between them.

Referring again to Fig. 1, it is now apparent that source 10 and pickup device 14 would be utilized for producing on-the-air signals, while source 20 and pickup device 24 would produce the preview signals. Thus source 20 and/or pickup device 24 may be positioned, either as a unit or separately, to achieve the results desired for the next presentation. Once the preview picture indicates that the desired angle, framing, etc., has been achieved, it is necessary to transfer pickup device 24 from preview to one-the-air. This is most readily achieved by replacing filters 22 and 122 with complementary filters 16 and 116. Under this new condition, source 20 now produces the on-the-air spectrum, while pickup device 24 responds to this spectrum and should be connected to the on-the-air circuit. Simultaneously, with this substitution, filters 16 and 116 should be replaced by complementary filters 22 and 122, thus converting units 10 and 14 to preview usage, and the presentation thereof should be applied to the preview circuit.

Since it is unnecessary that the preview signal contain as much detail as the on-the-air signal, it is possible to use a narrow bandwidth of radiations for this purpose. However, it is desired that the on-the-air television signals be as true a representation of the object as possible, and it is therefore advisable that the widest possible bandwidth be utilized. Unfortunately, this is limited by the bandwidth used for preview, and thus inherently limits detail.

The flying spot scanner pickup technique may be advantageously used for color television. In such a color system the pickup devices are generally an assembly comprising separate phototubes adapted to respond to red, blue, and green light. Their response may be achieved by the design of the phototubes, or by the use of color filters positioned in front of the tubes. We have found that if the narrow band utilized for preview is peaked at 490 millimicrons, and the red, green, and blue pickup means are peaked at 600, 540 and 450 millimicrons, respectively, both the preview and the on-the-air television output signals are satisfactory in color and detail. These values are illustrative only, others being useful under different conditions; such as light source, pickups, etc.

It will be realized that the above suggested values for obtaining the on-the-air signal will produce a spectrum which is not continuous but will actually contain a "notch." However, for the purposes of this explanation, it will still be called a spectrum, even though it in some cases may be a divided spectrum consisting of separate ranges.

As has been indicated above, deleting a small spectral range from the visible light introduces slight defects which may in some instances be objectionable. In black and white systems the defect would be a loss in detail, while in color systems the defect may be a loss of certain colors. Under some conditions, if the loss of color fidelity is objectionable, it may be minimized by modifying the response of the red, blue and green circuitry.

One method of achieving truer colors without the inherent difficulty of filter matching, and the loss of color associated with the multiplexing of visible colors, is to use as the preview spectral range a portion of radiations in the ultraviolet or infrared region. In this way, a true color representation containing all the visible radiations is presented to the on-the-air pickup device, while the preview presentation is obtained from the otherwise unused invisible radiations. Another advantage of the invisible radiation method is that the output signals produced by on-the-air pickup do not require the spectral correction previously described. Still another advantage is obtained, since the preview signal is produced by a relatively wide spectrum of invisible radiations, and may thus contain more detail than would be available through the use of the narrow visible preview spectrum previously discussed. It is advisable in the use of invisible radiation to utilize optical elements, light sources, and pickup means which produce, transmit, and respond to the bandwidth of radiations which are to be utilized.

As has been shown, any given predetermined portion of the spectrum may be utilized for the production of the preview signals. Of course the spectrum used for previewing, and the spectrum used for producing the on-the-air signals should be independent and mutually exclusive to avoid cross talk and interaction.

For the sake of simplicity and ease of explanation, Fig. 1 shows pickup tubes 14 and 24 as being separate elements positioned in close proximity to light sources 10 and 20, respectively. In actual practice, this difference in location of the on-the-air and the preview tubes tends to introduce disturbing variations of the lighting effects. It is therefore desirable that the preview and on-the-air pick-up devices be positioned as close together as is physically possible. In some cases it may even be desirable to use a lens system for picking up the reflected light, and to direct the desired spectrums to the preview and the on-the-air pick-up devices by means of semitransparent mirrors or beam-splitter cubes. In this arrangement, it is not necessary to switch filters in front of the pickup devices. Rather, the pickup devices are permanently connected to the corresponding on-the-air and preview amplifiers.

Referring now to Fig. 2, there is illustrated two flying spot scanner light sources 10 and 20. Source 10 has an on-the-air spectrum filter 16 positioned in front of it, while source 20 uses a preview filter 22. Thus, the conditions of illumination are the same as previously described. As hereinabove indicated, it is preferable that the preview and on-the-air pickup devices be positioned as close as possible to each other. In addition, it was indicated that for color television the on-the-air pickup device would comprise a plurality of phototubes, each having a particular spectral response. These two conditions are shown in Fig. 2 where preview pickup device 14 having a preview filter 122 is part of an assembly which comprises a red (20*r*), a green (20*g*), and a blue (20*b*) on-the-air pickup device, each of which responds only to its particular spectral range and not to the preview spectrum. This response may be achieved by phototube design and/or the use of suitable filters. For example, in the case of ultraviolet preview, the filters which cause phototubes 20*r* and 20*g* to respond to red and green, respectively, inherently prevent the passage of ultraviolet radiations. The filter which limits the response of phototube 20*b* to blue light would be required to show spectral cutoff characteristics which prevent the transmission of ultraviolet. We have found that the use of Wratten filters 18A and 2B for the preview and on-the-air filters 22 and 16 respectively, produce satisfactory results. The characteristics of the filters for previewing in the visible spectrum have already been discussed.

As is known to those in the art, spectrum separation may be achieved in a number of ways. The best known method is the use of a material which transmits only a given spectrum while rejecting all other radiations. Another method of color separation involves the use of selective reflection. Since our invention is not concerned with the specific apparatus used, the generic term "filter" will be understood to include all devices capable of this function.

In the arrangement of Fig. 2, the preview pickup device 14 is connected to the preview circuitry, while the on-the-air pickup devices 20 are always connected to the transmitting circuit. Due to the proximity of the preview and pickup devices, substantially the same view is obtained from each, the changes in angle, etc., being produced by moving the preview light source to a desired position, and then converting it to become the on-the-air source by filter substitution.

It has previously been explained that filter substituting means are necessary for the filters in front of the sources. The means to substitute one filter for another may be manual, mechanical linkages, electrooptical elements, or remotely controlled electromechanical devices. Since the filter substituting means, per se, are not part of our invention they will not be described in detail.

It is well known that pickup systems of the types described require optical systems. It is possible to position the filters, relative to the optical system, to achieve various effects. For example, if the filters have straight sides which butt, and are placed near the lens, substituting one filter for the other will produce a "dissolve" effect, where one presentation fades out while the other fades in. If, however, the filters are placed near the flying spot scanner, the filter substituting process will produce a "wipe" effect wherein the vertical line which separates the images will move across the presentation to diminish the area of one image, while increasing the area of the other.

By means of solenoids, etc., the filter substitution process may be made rapid enough so that it is practically instantaneous. If, however, it is desired to use round filters it may be advisable to momentarily blank out the light from the sources during the filter substitution process, and to provide interlocks to assure that at any given instant only one scanner emits each spectrum. We have achieved this result by the use of micro-switches and mechanical linkages, but a variety of apparatus and circuitry for this purpose is known to those in the art.

Fig. 2 shows one group of pickup means. It is known in the art that more artistic effects may be obtained by using a plurality of pickup means positioned in a variety of locations. This corresponds with the use of a plurality of light sources in a studio to produce keylight, fill-light and backlighting effects. In this case it will be understood that each location would have a preview and an on-the-air pickup device, the latter consisting of a plurality in the case of color television.

Having disclosed the principles and two embodiments of our invention, we desire to be limited not by the foregoing illustrations, but rather by the claims granted to us.

What is claimed is:

1. A pickup system comprising: a source of energy radiations including the visible and near visible spectral range; means causing an object to be simultaneously illuminated by said radiations including the visible and near visible spectral ranges; first pickup means; means comprising phototubes causing said pickup means to be responsive only to a first spectrum of said range, said means comprising a filter positioned in front of said first pickup means, said filter permitting passage of only said first spectrum while preventing passage of a second spectrum; second pickup means; means comprising phototubes causing said second pickup means to be responsive only to said second spectrum, said means comprising a second filter positioned in front of said second pickup means, said filter transmitting said second spectrum while preventing the passage of said first spectrum, said phototubes converting said energy radiations received thereby to television signal outputs.

2. The apparatus of claim 1 wherein one of said spectrums is in the ultraviolet region.

3. The apparatus of claim 1 wherein one of said spectrums is in the infrared region.

4. The device of claim 1 including means to interswitch the output of said phototubes.

5. A pickup system comprising: means causing an object to be simultaneously illuminated by two mutually exclusive spectrums; said means comprising: a source of radiations including the visible and near visible spectral range; an object positioned to be illuminated by said source, a filter positioned in front of said source, said filter preventing passage of a first spectrum while transmitting a second spectrum; a second source of radiations covering the visible and near visible range; said second source also illuminating said object, a second filter positioned in front of said second source, said second filter transmitting said first spectrum while preventing the passage of said second spectrum; pickup means responsive only to said first spectrum; and second pickup means responsive only to said second spectrum.

6. The device of claim 5 including means to interswitch said filters.

7. The device of claim 5 including means to interswitch the output of said pickup means.

8. The apparatus of claim 5 wherein said first spectrum is in the ultraviolet region.

9. The apparatus of claim 5 wherein said first spectrum is in the infrared region.

10. Apparatus for providing television type signals of an object, comprising: a flying spot scanner producing energy in two spectral ranges serving as a first light source to illuminate said object; spectral range separation means positioned in front of said flying spot scanner, said means transmitting one of said spectral ranges and preventing passage of the other of said spectral ranges of said light source; preview pickup means responsive to said first spectral range, said means comprising a photocell and spectrum separating means positioned in front of it, said means transmitting only said first spectral range of the spectrum, whereby only radiations within said first spectral portion of the spectrum are reflected from said object to produce a preview signal; a second flying spot scanner serving as a second light source to simultaneously illuminate said object; a second spectrum separating means positioned in front of said second flying spot scanner, said means transmitting a second spectral range complementary to said first spectral range; on-the-air pickup means responsive only to said second spectral range, said means comprising a photocell and a spectral range separating means positioned in front of it, said means transmitting only said second spectral range; whereby only radiations from said second spectral range are reflected from said object to produce the on-the-air signal.

11. The apparatus of claim 10 wherein on-the-air pickup means comprises a plurality of separate pickup devices, each responsive to only a particular portion of the spectrum.

12. The apparatus of claim 10 including means to substitute complementary spectral range separating means for each said spectral range separating means positioned in front of said sources.

13. The apparatus of claim 10 wherein said predetermined portion of the spectral range is in the invisible region.

14. The apparatus of claim 10 wherein said predetermined portion of the spectral range is in the ultraviolet region.

15. The apparatus of claim 10 wherein said predetermined portion of the spectral range is in the infrared region.

16. A television pickup system comprising a source of energy radiation including the visible and near visible spectral ranges, means causing an object to be simultaneously illuminated by said two spectral ranges of said radiation, a filter positioned in front of said source, said filter preventing the passage of one of said spectral ranges while transmitting the other, a second source of energy radiation including the visible and near visible spectral ranges, a second filter positioned in front of said second source, said second filter transmitting said one of said spectral ranges while preventing the passage of said other of said spectral ranges; pickup means responsive only to said one of said spectral ranges, a second pickup means responsive only to said other of said spectral ranges, said pickup means comprising a plurality of phototubes, said phototubes converting said energy radiation received thereby to television signal outputs whereby a preview picture signal is made available.

References Cited in the file of this patent

UNITED STATES PATENTS

| | | |
|---|---|---|
| 2,723,307 | Baracket et al. | Nov. 8, 1955 |
| 2,753,395 | Lawrence | July 3, 1956 |
| 2,817,265 | Covely | Dec. 24, 1957 |